(12) United States Patent
Matsuura et al.

(10) Patent No.: US 6,930,796 B1
(45) Date of Patent: Aug. 16, 2005

(54) APPARATUS FOR AND A METHOD OF FORMING AN IMAGE

(75) Inventors: Tsumoru Matsuura, Matsudo (JP); Takenori Idehara, Machida (JP); Masafumi Aikawa, Machida (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/568,395

(22) Filed: May 10, 2000

(30) Foreign Application Priority Data

May 11, 1999 (JP) .................................. 11-130578

(51) Int. Cl.[7] ........................................... G06K 15/00
(52) U.S. Cl. ........................ 358/1.2; 358/1.1; 358/1.13; 358/1.15
(58) Field of Search ........................... 358/1.1, 1.2, 1.6, 358/1.12, 1.13, 1.14, 1.15, 537, 406, 449, 358/451; 399/81, 86, 370, 389

(56) References Cited

U.S. PATENT DOCUMENTS

| 4,876,609 A | * | 10/1989 | Ogura ........................ 358/443 |
| 2003/0041102 A1 | * | 2/2003 | Simpson et al. ............ 709/203 |

FOREIGN PATENT DOCUMENTS

| JP | 09-314925 (A) | 12/1997 |
| JP | 10-278374 (A) | 10/1998 |

* cited by examiner

*Primary Examiner*—Arthur G. Evans
(74) *Attorney, Agent, or Firm*—Sidley Austin Brown & Wood LLP

(57) ABSTRACT

Whether it is possible to print each one of a plurality of pages of image data on a paper of a designated size is determined. As to a page which is determined printable on a paper of the designated size as papers of the designated size are available in paper feed parts, the page is printed out on a paper of the designated size. As to a page which is determined unprintable on a paper of the designated size as papers of the designated size are not available in the paper feed parts, data representing the page are saved and the page is printed in a reduced size or otherwise appropriately printed on a paper of a different size. In this manner, all pages of the image data are printed, and at the same time, notification is provided to notify the fact that printing on a paper of the different size was conducted. When papers of the appropriate designated size are supplied, printing as designated is executed. It is also possible to select whether to stop printing in the designated size.

28 Claims, 8 Drawing Sheets

S1

Notification of forced printing

Job 01 is printed in a different size since there is no A3-size paper.

Page 1, Page 5, Page 13 (last page)

forced print forced print forced print

A3 ( appropriate designated size ) → A4 ( forced printing size )

APPARATUS FOR AND A METHOD OF FORMING AN IMAGE

RELATED APPLICATION

This application is based on application No. 11-130578 filed in Japan, the entire content of which is hereby incorporated by reference.

BACKGROUND OF THE INVENTION

1. Field of the Invention

The present invention relates to an apparatus for and a method of forming an image. The present invention more particularly relates to an image forming apparatus and an image forming method with which a printing efficiency does not deteriorate even where a paper of a designated size is not set, etc.

2. Description of the Related Art

An image forming apparatus, such as a copier machine and a printer, generally comprises a plurality of paper feed parts to provide for papers of various sizes.

When a print job containing more than one pages whose sizes are different from each other is to be executed using such an image forming apparatus, papers of designated sizes for the respective pages are automatically fed from the paper feed parts.

For example, in the case of printing image data based on a mixed-originals group which consists of originals having different sizes from each other, a paper size is designated for each page. A paper is supplied into the apparatus from the paper feed part which is selected based on a designated paper size, and image data representing each page is printed on a paper as designated.

However, a user wishing to print originals of various sizes sometimes designates a size which is not available in the paper feed parts. The paper feed part for holding papers of a designated size may be empty in other cases.

One of the known techniques to deal with such a situation is to stop printing with a warning sign turned on until papers of a designated size (paper feed cassette) are supplied. Still, this processing only extends a printing time and accordingly hampers print jobs requested by other users.

Meanwhile, although it is not printing technology for a print job including multiple pages of various sizes, another known technique is to ignore the designated size and print in a currently selected size. While this does not extend a printing time longer, this results in printing on papers of an inappropriate size regardless of whether this is allowable and therefore requires later a separate labor for re-printing after supplying papers of an appropriate size.

Still other known technique (Japanese Patent Application Laid-Open Gazette No. 9-314925) is to store in a memory device data representing a page for which a paper of a size not available in the paper feed parts is designated and to thereafter print data which represent a page whose paper size is available in the paper feed parts as priority printing. This processing prevents printing on a paper of an inappropriate size without increasing a printing time.

However, the technique described in the gazette above demands to print while skipping data representing a page for which a paper of a size not available in the paper feed parts is designated. With such an apparatus, after printing data which represent a page whose paper size is available in the paper feed parts as priority printing, papers of the designated size for example must be supplied and the data stored in the memory device must be there after printed, which is an extra labor. In addition, after printing the stored data on a paper of the appropriate designated size, it is necessary to sort the printed sheets in the order of pages while confirming the directions of the originals. This is cumbersome and tends to induce a mistake.

For this reason, some users wish to print for the time being all pages on papers of a size available in the paper feed parts. In this case, one approach is to print a page of a size not available in the paper feed parts in a reduce size, for instance, so that an entire page is printed. When the page is printed on a paper of a size available in the paper feed parts in such a manner, the pages are printed in order, if not necessarily with right image sizes.

Nevertheless, some uses can not endure printing on a paper of a different size from a designated size, which requires some solution.

SUMMARY OF THE INVENTION

An object of the present invention is to solve the inconveniences described above.

A further object of the present invention is to provide for an image forming apparatus and an image forming method with which it is possible to execute a print job which includes more than one pages of different sizes from each other in an efficient manner.

A yet another object of the present invention is to provide for an image forming apparatus and an image forming method which allow to execute a print job including more than one pages of different sizes from each other in an efficient manner and which notify printing on a paper of a designated size when such printing is executed.

These and other objects are attained by a printer having a receiving part for receiving image data including a plurality of pages, a printing part for printing on papers based on the received image data, a paper feed part for supplying papers of designated sizes designated for respective pages to the printing part, and a control part for supplying a different size to the printing part when papers of a designated size are not available in the paper feed part and for printing in a reduced size on supplied papers and for notifying a user of the printing in the reduced size.

The objects above are attained by an image forming apparatus having judging member for judging whether each one of a plurality of pages of image data can be printed on a paper of a designated size, printing member which prints a page which the judging member judges printable on papers of the designated size on a paper of the designated size, the printing member printing a page which the judging member judges not printable on papers of the designated size on a paper of a size other than the designated size to thereby print out all pages of the image data, and notification member for notifying of printing on a paper of a size other than the designated size.

The invention itself, together with further objects and attendant advantages, will best be understood by reference to the following detailed description taken in conjunction with the accompanying drawings.

BRIEF DESCRIPTION OF THE DRAWINGS

In the following description, like parts are designated by like reference numbers throughout the several drawing.

DESCRIPTION OF THE PREFERRED EMBODIMENTS

First Preferred Embodiment

Figure 1:
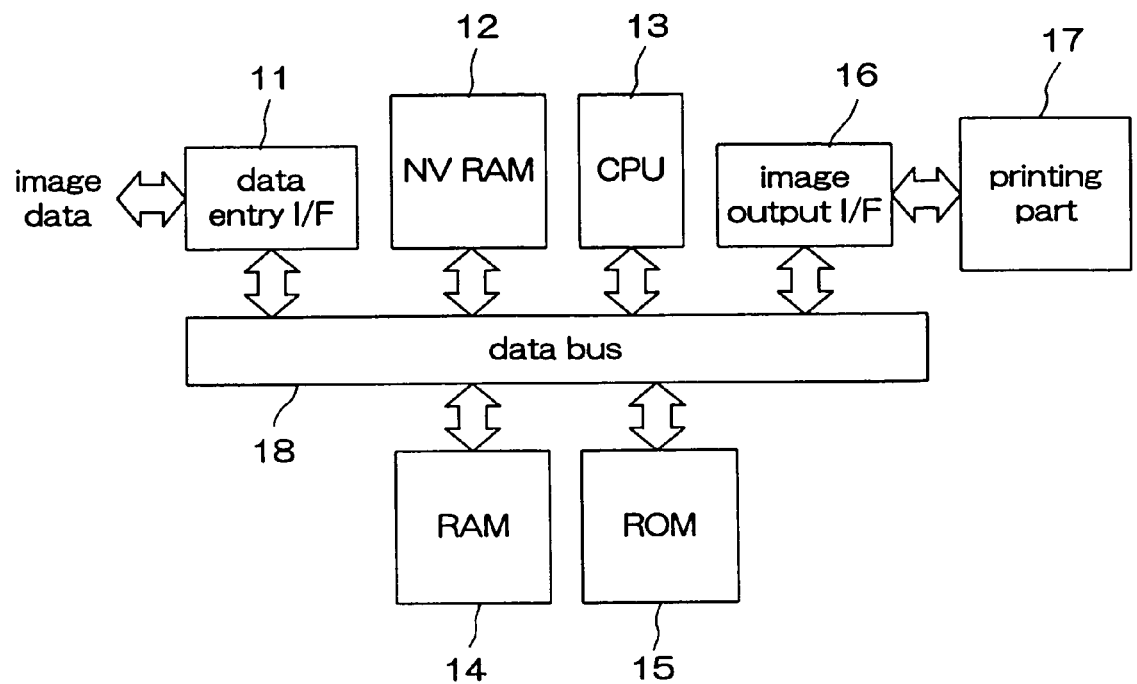
FIG. 1 is a block diagram showing a structure of a control part of a printer.
Figure 8:
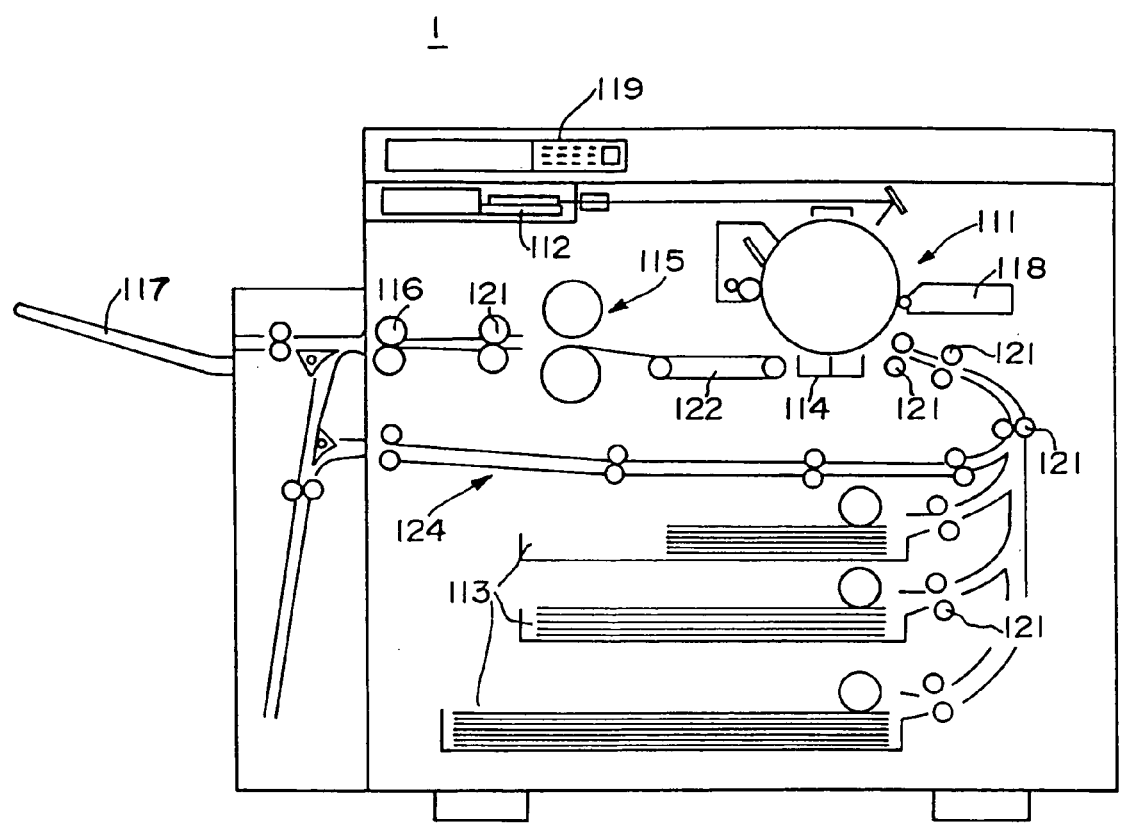
FIG. 8 is a diagram showing a cross section of the printer.

FIG. 8 is a diagram showing a cross section of a printer 1. FIG. 1 is a block diagram for describing a structure of a control part of the printer 1.

The printer 1 shown in FIG. 8 is a printer of the electrophotographic method, and comprises a photosensitive drum 111 on which an electrostatic latent image is formed, a laser (or LED) emitting unit 112 for forming an electrostatic latent image on the photosensitive drum 111, a paper cassette 113 holding papers, a developer 118 for developing an electrostatic latent image formed on the photosensitive drum 111 and thereby forming a toner image, a transfer charger 114 for transferring a developed toner image onto a paper, a fixing unit 115 for fixing a transferred image on a paper, a discharge roller 116 for discharging a paper after fixing, a paper discharge tray 117 in which discharged papers are stacked up, and a transport roller 121 and a transport belt 122 which sequentially transport papers from the paper cassette 113 to the photosensitive drum 111, the fixing unit 115 and the discharge roller 116. The printer 1 further comprises a double-side unit 123 which inverts a paper discharged from the discharge roller 116 for the purpose of double-side printing, and a transport path 124 for transporting an inverted paper back to the photosensitive drum 111 once again. Further disposed in a top portion of the printer 1 is an LCD touch panel 119 for displaying various types of inputs needed to operate the printer 1 and various types of messages.

The paper cassette 113 can hold three bundles of papers, and hence, papers of three different sizes in total.

Next, basic operations and a structure to form an image will be briefly described with reference to FIG. 1.

First, a data entry interface (I/F) 11 is provided with image data from an external personal computer, scanner, etc. A CPU 13 executes a predetermined program which is stored in a ROM 15, whereby necessary processing, such as lusterizing, is executed on the inputted image data and the image data are expanded within a RAM 14 in the form of bit map data. The expanded bit map data are outputted to a printing part 17 through an image output I/F 16. The printing part 17 prints in the electrophotographic method, thereby outputting the data as a printed matter.

An NVRAM 12 is a memory for storing initial setting, various types of parameters, and the like. A data bus 18 is a path for transmitting various types of control signals in addition to image data to the respective parts. The RAM 14, while used as a memory for expanding image data as bit map data, also functions to store received image data as they directory are, etc. Further, in addition to the RAM 14, large-capacity memory means such as a hard disk drive (HDD) may be used as means for storing image data.

The printer 1 is different from a conventional printer with respect to an operation which is initiated as the CPU 13 executes a program which is generated in accordance with procedures which will be described later. Hence, nothing is different from a conventional printer with respect to basic operations of forming an image, e.g., a process per se of forming a color image or a monochrome image in the electrophotographic method.

Figure 2:
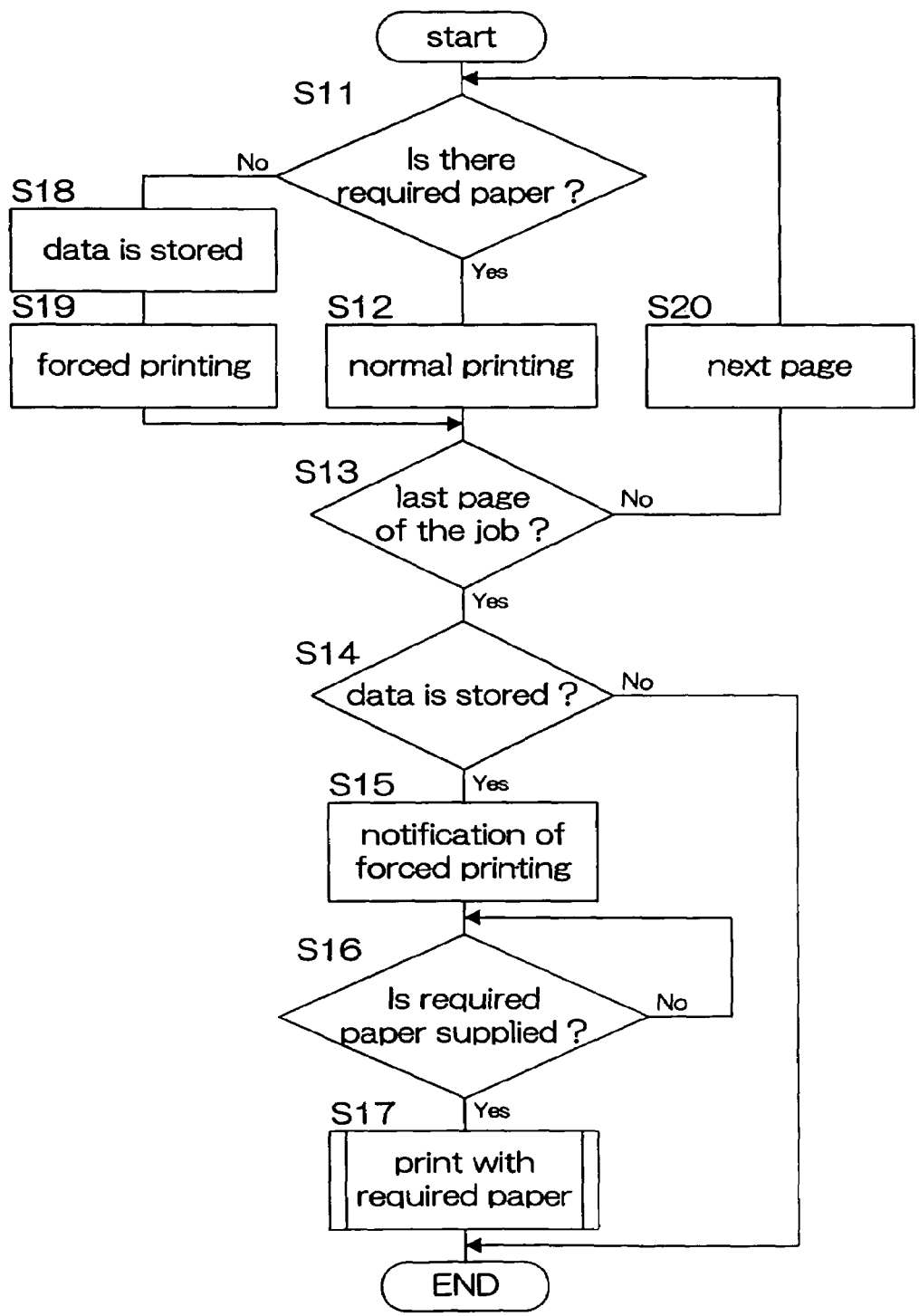
FIG. 2 is a flow chart showing printing.

FIG. 2 is a flow chart showing procedures of printing with the printer 1.

For instance, when it is desired to execute a print job including more than one pages based on a mixed-originals group which consists of originals having different sizes from each other, e.g., A4-size originals and A3-size originals mixed together, first, the data entry I/F 11 receives image data and the RAM 14 stores the image data.

Following this, with respect to each page, whether image data representing each page of the more than one pages can be printed on a paper of a designated size is determined (S11). This is achieved by determining whether the size of a paper designated for each page of the image data matches with any one of the sizes of papers which are contained in a plurality of paper feed parts not shown of the image forming apparatus. A sensor or the like not shown which is disposed to each paper feed part detects the size of papers which are held in each paper feed part.

When it is determined at the step S11 that it is possible to print the page on papers of the designated size, the page is printed as it is on a paper of the designated size normally as usual (S12, normal printing).

On the contrary, when it is determined that it is not possible to print on papers of the designated size, the data representing the page are temporarily stored in a predetermined area within the RAM 14 (S18). At the same time, the page is forcedly printed on a paper which is currently available for printing (S19, forced printing). More specifically, the forced printing is realized by printing on a paper whose size is not the designated one in the following manners, for example. That is, the page is printed in a reduced size on a paper of a small size, the page is divided and printed over two or more papers, the page is printed on a paper of a close size, the page is printed on a paper of a large size, etc. In this manner, it is possible to forcedly print in various types of styles which are available for printing.

Such processing is repeated (S13, S20), whereby image data of each one of the more than one pages are printed normally or forcedly page by page.

With the last page of the print job printed normally or forcedly, whether the data representing a page which was determined impossible to print on a paper of the designated size are saved or not is determined (S14). When it is judged that the data representing the page not printable on a paper of the designated size are saved, the fact that the page was printed forcedly is notified (S15).

The notice of the forced printing at the step S15 is attained by notifying the fact that there is a page which was forcedly printed and the paper size which is necessary for appropriate printing of the page, for example. More particularly, the forced printing is notified in the following manner, for example.

Figure 3:
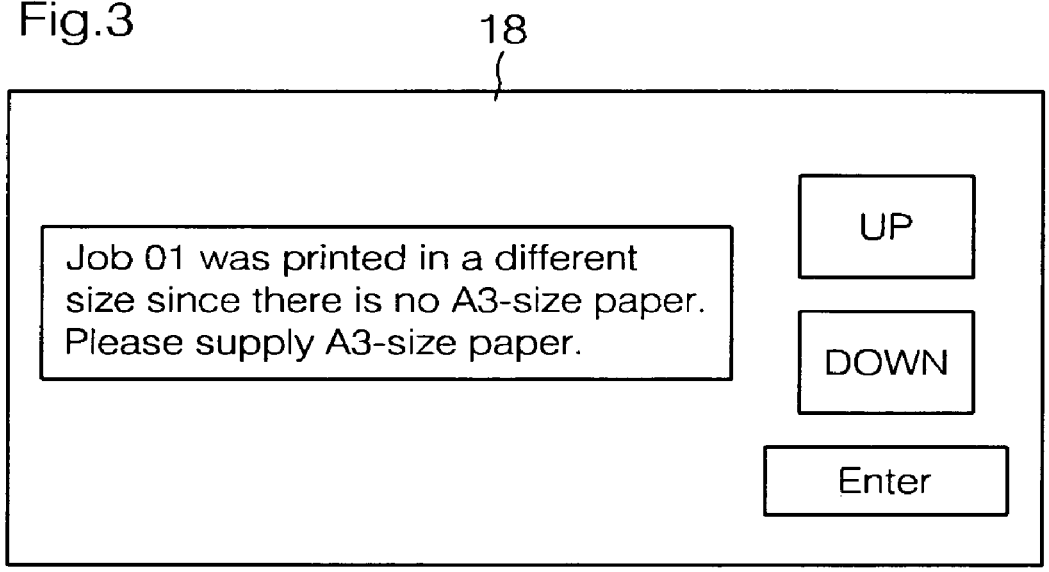
FIG. 3 is a diagram showing an operation part as it is to notify of forced printing.

FIG. 3 is a diagram showing notification of forced printing by means of a display provided on an operation part of the printer. That is, the operation part 18 of the printer shows a predetermined message, reading for example, "Job 01 was printed in a different size since there is no A3-size paper.

Please supply A3-size paper." In this manner, it is notified that there is a page which was forcedly printed and the paper size which is necessary for appropriate printing of the page.

Figure 4:
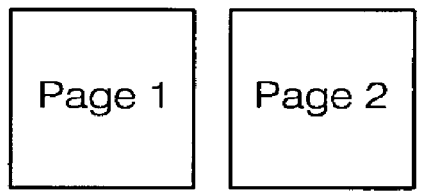
FIG. 4 is a diagram showing a page regarding which forced printing needs be notified.
Figure 4:
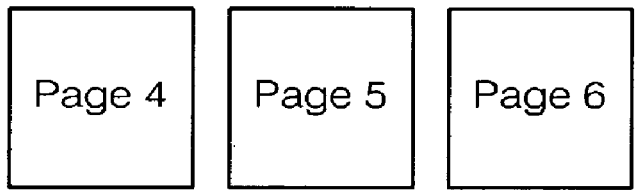
Figure 4:
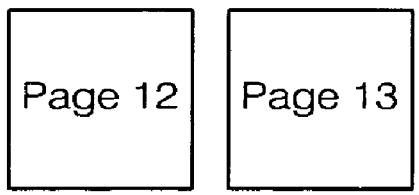
Figure 5:
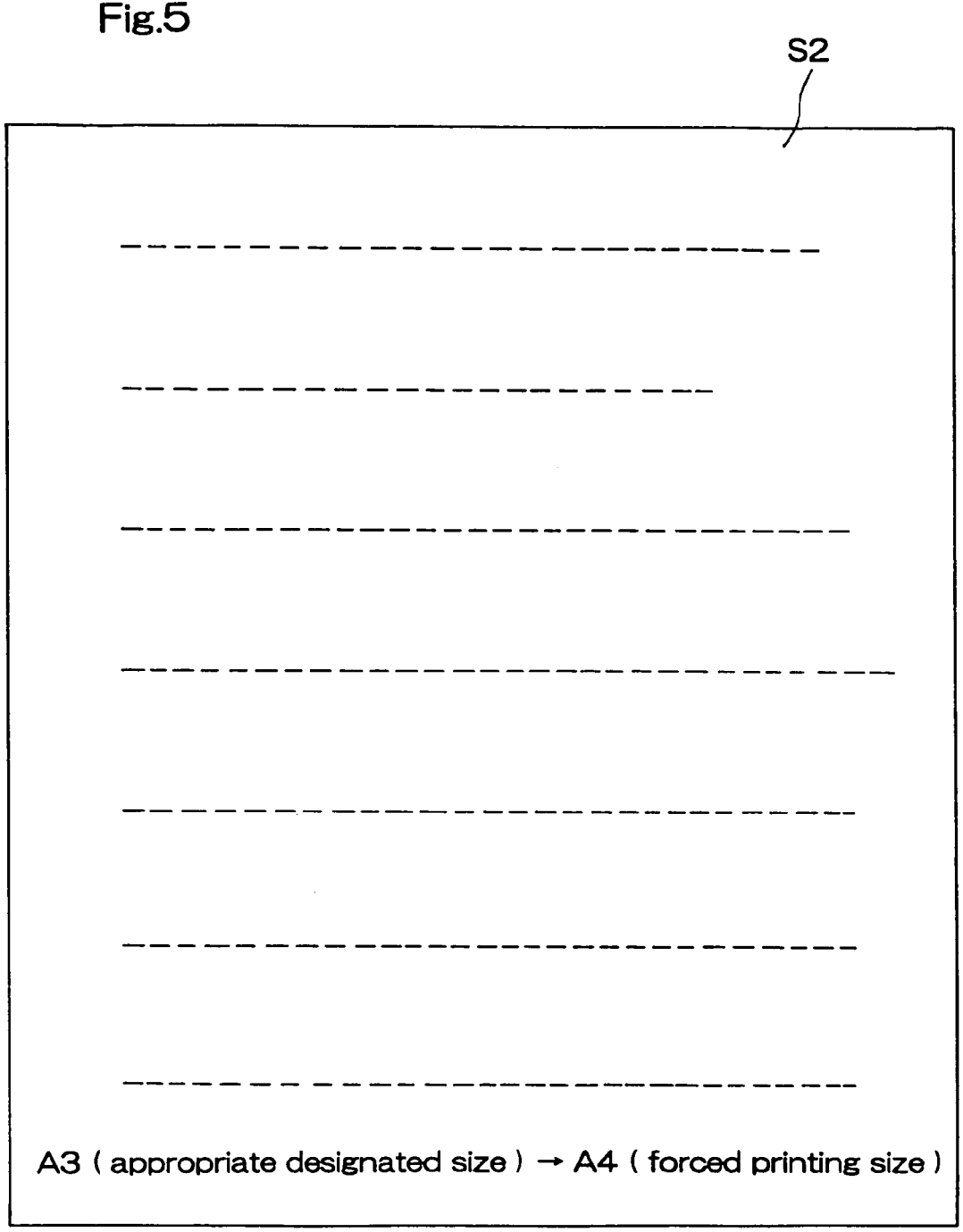
FIG. 5 is a diagram showing a page which was printed forcedly with a printed description indicative of the forced printing.

Notification of forced printing is not limited to a display on the operation part 18 of the printer but may be realized in various types of ways. FIG. 4 is a diagram showing notification of forced printing in the form of a separate notification page which bears a statement of notice and is added to the last page of a print job. In this case, it is also possible to display a forcedly printed page and pages before and after this page each approximately in a reduced size as that shown in FIG. 4. This makes it easier to later replace the forcedly printed sheet with a sheet printing in the appropriate designated size. FIG. 5 is a diagram showing notification of forced printing in the form of a statement of notice which is given on a sheet printing the forcedly printed page. In this case, as shown in FIG. 5, in the margin of a sheet S2 on which the page was forcedly printed, there is a description of an appropriate designated size and the size other than the designated one in which the page was forcedly printed. The notification methods for notifying forced printing shown in FIGS. 3 through 5 may be appropriately combined with each other.

After the notification of the forced printing in such a manner, whether papers of the designated size necessary for appropriate printing of the forcedly printed page are supplied is determined (S16). With papers which are needed for appropriate printing supplied, the data of the forcedly printed page stored in the predetermined area of the RAM 14 are read out, and automatically printed out on a paper of the appropriate designated size (S17).

As described above, according to this preferred embodiment, even when a mixed-originals group includes an original whose size is not available in the paper feed parts of the image forming apparatus, it is possible to prevent the printer from stopping printing due to lack of the designated-size papers and accordingly lowering a printing efficiency.

Further, it is possible to print saved data of a forcedly printed page on a paper of an appropriate designated size later based on notification of forced printing. In addition, simple replacement of a forcedly printed sheet with a printed sheet of the appropriate designated size makes it easily possible to complete a printed matter whose pages are in order without any error.

Still further, after the notification of the forced printing, as papers of the designated size needed for appropriate printing of the forcedly printed page are supplied, the saved data of the forcedly printed page are automatically printed on those papers. Printing in this manner is quick and as desired, without any trouble to a user.

Second Preferred Embodiment

Figure 6:
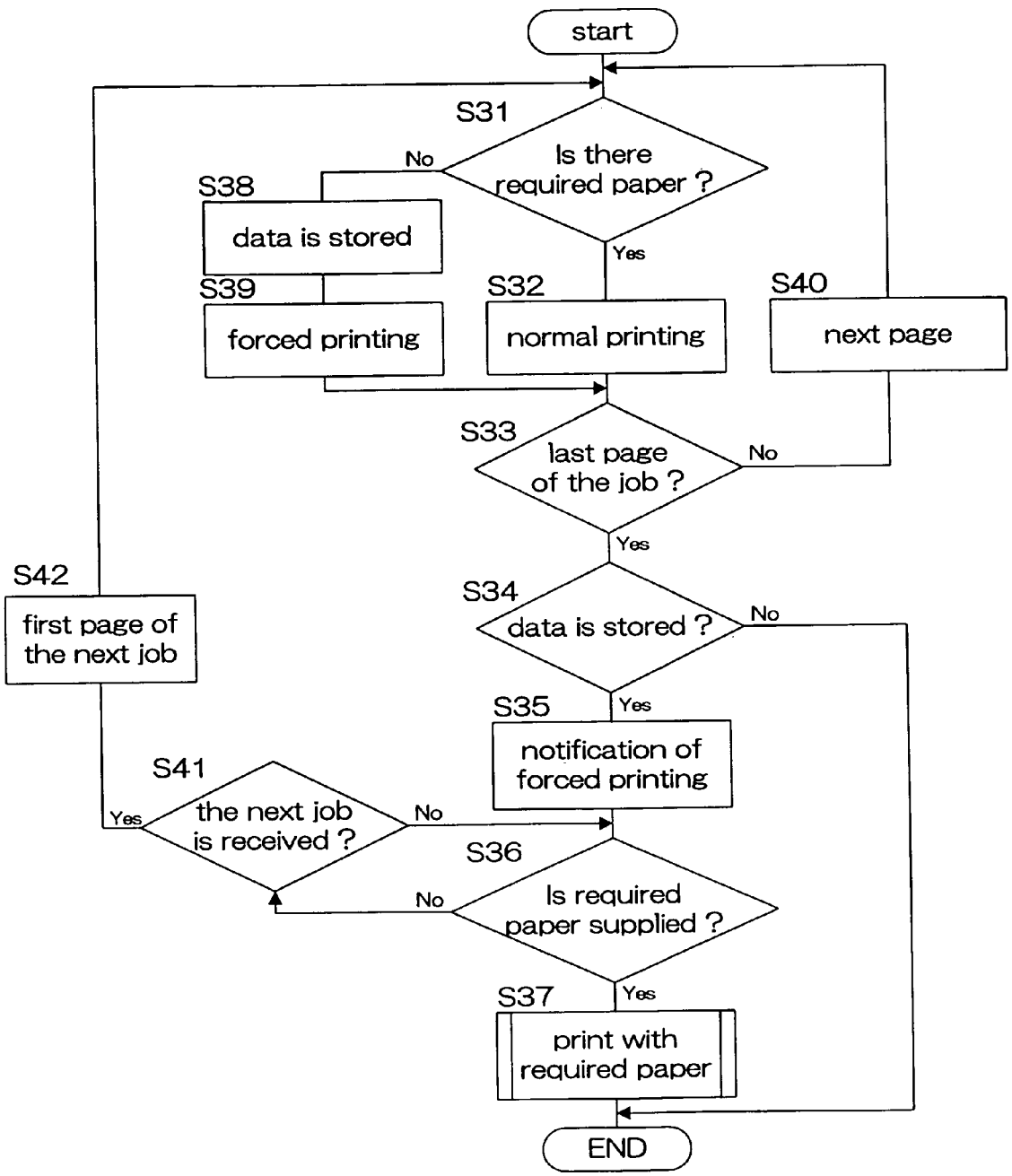
FIG. 6 is a flow chart showing printing (second preferred embodiment)

FIG. 6 is a flow chart showing procedures of printing according to a second preferred embodiment.

The second preferred embodiment is different from the first preferred embodiment in requiring that when a next print job is received during a stand-by period after notification of forced printing, the received print job is executed. The second preferred embodiment is otherwise similar to the first preferred embodiment. Since steps S31 through S40 in the flow chart shown in FIG. 6 are therefore similar to the steps S11 through S20 in the flow chart shown in FIG. 2, and will not be described.

According to the second preferred embodiment, when the data entry I/F 11 receives a next print job after notification of forced printing (S35) but before supply of papers of a designated size needed for appropriate printing of a forcedly printed page (NO at S36), the received print job is given priority and executed (S42).

Hence, it is possible to prevent a situation that operations for the next print job can not be initiated because of the print job which resulted in the forced printing. In this manner, it is possible to reliably obviate obstruction against other print jobs.

Third Preferred Embodiment

Figure 7:
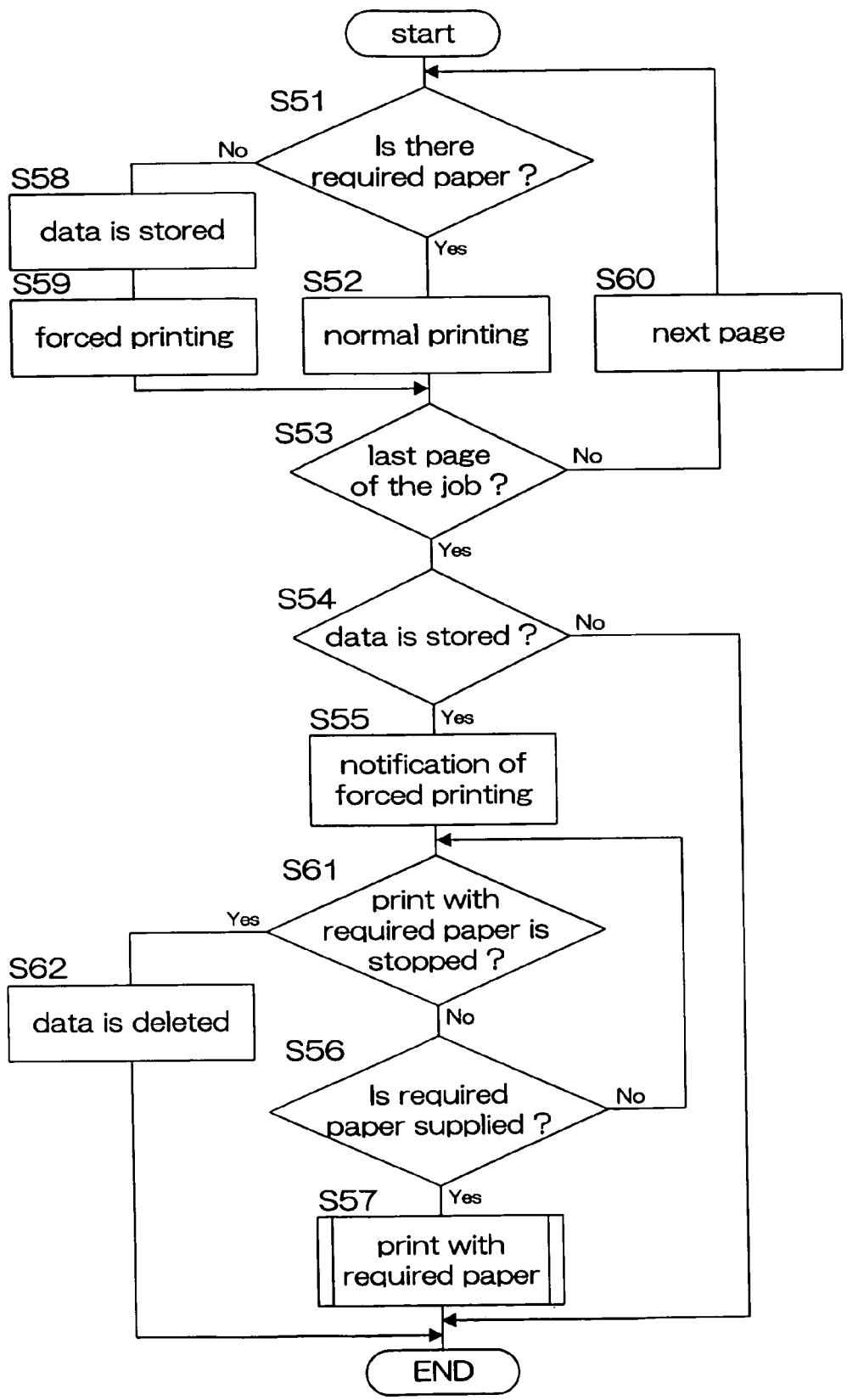
FIG. 7 is a flow chart showing printing (third preferred embodiment)

FIG. 7 is a flow chart showing procedures of printing according to a third preferred embodiment.

The third preferred embodiment is different from the first preferred embodiment in requiring to use selecting means which selects whether to stop printing of a forcedly printed page on a paper of an appropriate designated size. The third preferred embodiment is otherwise similar to the first preferred embodiment. Since steps S51 through S60 in the flow chart shown in FIG. 7 are therefore similar to the steps S11 through S20 in the flow chart shown in FIG. 2, and will not be described.

According to the third preferred embodiment, after notification of forced printing (S55) or at the same time with the notification, whether it was determined to stop printing saved data of a forcedly printed page on a paper of an appropriate designated size or not is judged (S61). More specifically, the operation part of the printer, for example, shows a display inquiring whether it is necessary to print on a paper of the appropriate designated size, allowing one to choose YES or NO on the operation part. Of course, when a next print job is received before choosing, the next print job may be given priority and executed, as in the second preferred embodiment. When it is judged that a selection made requires to stop printing on a paper of the appropriate designated size, the saved data of the forcedly printed page are deleted (S62).

Hence, where forced printing was executed in a reduced size on a paper of a small size and a user, looking at a completed printed matter containing the forcedly printed sheet, determines that the printed matter is good enough to use, the user can quickly terminate this print job on the ground that the printed matter is already completed. This eliminates a labor of printing saved data of the forcedly printed page on a paper of an appropriate designated size later, and further reduces a printing time.

Although the foregoing has described the image forming apparatus according to the preferred embodiments above in relation to a printer, the image forming apparatus may be a digital copier machine. In the case of a digital copier machine, in each one of the preferred embodiments above, instead of receiving data from an external apparatus, data may be entered through a reader apparatus which is disposed to the copier machine.

According to the preferred embodiments above, even when a print job consisting of more than one pages includes a page which can not be printed as designated, it is possible to prevent a situation that the printing operations are stopped and a printing efficiency consequently deteriorates.

Further, where data of a forcedly printed page are printed later appropriately as designated in accordance with notification of the forced printing, simple replacement of the forcedly printed sheet with the sheet printing appropriately as designated easily completes the printed matter whose pages are in order without an error.

According to the preferred embodiments above, it is possible to prevent a situation that operations for the next print job can not be initiated because of the print job which resulted in the forced printing. Hence, it is possible to reliably obviate obstruction against other print jobs.

According to the preferred embodiments above, when it is ready to print out appropriately as designated after notification of forced printing, saved data of a forcedly printed page are automatically printed out. This makes it possible to execute desired printing quickly without forcing any trouble to a user.

According to the preferred embodiments above, when a user, looking at a completed printed matter containing a forcedly printed sheet, determines that the printed matter is good enough to use, the user can quickly terminate this print job on the ground that the printed matter is already completed. This eliminates a labor of printing saved data of the forcedly printed page on a paper of an appropriate designated size later, and further reduces a printing time.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A printer comprising:
   a receiving part for receiving a print job including image data of a plurality of pages of at least two different sizes;
   a printing part for printing the image data;
   a paper feed part for supplying papers of designated sizes designated for respective pages to the printing part;
   a control part for causing the paper feed part to supply paper of a different size to the printing part when papers of a designated size are not available in the paper feed part and for causing the printing part to print image data of a page in a reduced size on said supplied papers of a different size; and
   a storage part for saving image data of pages printed on papers of a different size.

2. A printer comprising:
   a receiving part for receiving image data including a plurality of pages;
   a printing part for printing on papers based on the received image data;
   a paper feed part for supplying papers of designated sizes designated for respective pages to the printing part;
   a control part for supplying a different size to the printing part when papers of a designated size are not available in the paper feed part and for printing in a reduced size on supplied papers; and
   notification means for notifying a user of the printing in the reduced size.

3. A printer as claimed in claim 2, wherein the notification means notifies a user of a page number of a page printed in a reduced size.

4. A printer as claimed in claim 2, wherein the notification means prints a notification on a paper printed in a reduced size.

5. A printer as claimed in claim 2, wherein the notification means prints a notification on a paper.

6. A printer as claimed in claim 2, wherein the notification means displays a notification.

7. An image forming apparatus comprises:
   judging means for judging whether each one of a plurality of pages of image data can be printed on a paper of a designated size;
   printing means which prints a page which the judging means judges printable on papers of the designated size on a paper of the designated size, the printing means printing a page which the judging means judges not printable on papers of the designated size on a paper of a size other than the designated size to thereby print out all pages of the image data;
   memory means for storing image data of pages on a paper of a size other than the designated size; and
   notification means for notifying of printing on a paper of a size other than the designated size.

8. An image forming apparatus as claimed in claim 7, wherein the printing means executes a received print job, when a next print job is received during a stand-by period after the notification means notifies of printing on a paper of a size other than the designated size.

9. An image forming apparatus as claimed in claim 7, wherein the printing means prints out a page which the judging means judges not printable on papers of the designated size, when it becomes ready to print on papers of the designated size.

10. An image forming apparatus as claimed in claim 9, further comprising:
    selecting means which selects whether or not to stop printing of a page which the judging means judges not printable on papers of the designated size on a paper of the designated size.

11. An image forming method comprising the steps of:
    determining whether it is possible to print out each one of a plurality of pages of image data on a paper of a designated size;
    printing a page which is determined printable on papers of the designated size on a paper of the designated size;
    printing a page which is determined not printable on papers of the designated size on a paper of a size other than the designated size;
    saving pages of image data printed on paper of a size other than the designated size; and
    notifying of printing on a paper of a size other than the designated size.

12. A method for printing a first print job having a plurality of pages of at least two different paper sizes, the method comprising:
    identifying a size of paper for each page to be printed;
    determining whether paper of the identified size is available;
    printing a page on paper of the identified size if the paper is available; and
    printing a page on paper of an alternate size if paper of the identified size is not available.

13. The method of claim 12 further comprising:
    determining that paper of an identified size for a page stored in the memory has become available; and
    printing the page stored in the memory on the paper of the identified size.

14. The method of claim 13, further comprising:
    accepting an indication to cease printing of pages stored in the memory; and
    ceasing printing of pages stored in the memory responsive to said indication.

15. The method of claim 12, wherein notifying an operator comprises printing a page identifying pages that have been printed on paper of an alternative size.

16. The method of claim 12, wherein notifying an operator comprises printing a notice on each page that was printed on paper of an alternate size.

17. The method of claim 12 further comprising scaling a page so that it fits on a page of the alternate size.

18. The method of claim 12 further comprising:
determining whether a second print job is to be printed; and
performing the steps of identifying, determining, printing, storing, and notifying for the second print job.

19. The method of claim 18 further comprising retaining the stored pages from the first print job while printing the second print job.

20. The method of claim 19 further comprising:
determining that paper of an identified size for a page stored in the memory has become available; and
printing the page stored in the memory on the paper of the identified size.

21. The method of claim 12, further comprising storing a copy of each page printed on paper of an alternate size.

22. The method of claim 12, further comprising notifying an operator of any pages printed on paper of an alternate size.

23. A printer comprising:
a receiving part for receiving a print job including image data of a plurality of pages of at least two different sizes;
a printing part for printing the image data;
a paper feed part for supplying papers of designated sizes designated for respective pages to the printing part; and
a control part for (1) causing the paper feed part to supply paper of a designated size to the printing part when papers of a designated size are available in the paper feed part and for causing the printing part to print image data of a page in a reduced size on said supplied papers of the designated size, and (2) causing the paper feed part to supply paper of a different size to the printing part when papers of a designated size are not available in the paper feed part and for causing the printing part to print image data of a page in a reduced size on said supplied papers of a different size.

24. The printer of claim 23, further comprising a storage part for saving image data of pages printed on papers of a different size.

25. The printer of claim 23, further comprising a notification means for notifying a user of the printing in the reduced size.

26. The printer of claim 25, wherein the notification means notifies a user of a page number of a page printed in a reduced size.

27. The printer of claim 25, wherein the notification means prints a notification on a paper printed in a reduced size.

28. The printer of claim 25, wherein the notification means comprises a display on which a notification is displayed.

* * * * *